United States Patent [19]

Neat et al.

[11] 4,419,397
[45] Dec. 6, 1983

[54] SCABROUS SURFACE LIGHT DIRECTOR

[76] Inventors: Clarence E. Neat; Mark A. Neat, both of 6 Sundown Dr., Rolling Hills Estates, Calif. 90274

[21] Appl. No.: 368,048

[22] Filed: Apr. 14, 1982

[51] Int. Cl.³ .................. B32B 3/26; B32B 15/08
[52] U.S. Cl. .................... 428/141; 428/161; 428/913
[58] Field of Search .......... 428/161, 162, 141, 142, 428/913

[56] References Cited

U.S. PATENT DOCUMENTS 3,357,773 12/1967 Rowland ............................ 428/161
3,419,458 12/1968 Brooks et al. .................... 428/164
4,073,991 2/1978 Focht .................................. 428/164

*Primary Examiner*—Paul J. Thibodeau
*Attorney, Agent, or Firm*—Sughrue, Mion, Zinn, Macpeak & Seas

[57] ABSTRACT

A light director is provided for the enhancement of plant growth in dark areas. The light director comprises a substrate having a scabrous surface to which there is attached a multi-layer of reflective material. The reflective material comprises a layer of film adhered to the substrate, a layer of metal foil is adhered to the film and a further layer of film is adhered to the metal foil. The composition and color of the coating of films and the texture of the substrate determines the dispersion, quantity, and spectral content of the light director.

11 Claims, 2 Drawing Figures

SCABROUS SURFACE LIGHT DIRECTOR

BACKGROUND OF THE INVENTION

1. Field of the Invention

This invention relates to a new and novel means for dispersing and redirecting natural and artificial light and of making reflective articles that produce these results. A multilayer reflective coating is closely affixed to a substrate; such that, the scabrous surface texture of the substrate is imparted to the surface of the reflective coating.

2. Statement of the Prior Art

The prior art discloses decorative plastic striping or embossed laminate for decorative purposes. Pattern sheet material having lens-like formations are also known. However, none of the prior art discloses a scabrous surface light director having multiple reflective coatings which is used for controlling the light directed to the growing of plants and for heating water as well as lighting dark areas in an exotic fashion. Representative of the prior art are U.S. Pat. Nos. 3,357,773 (Rowland); 3,419,458 (Brooks et al); and 4,073,991 (Focht). These patents do not show an invention as claimed herein.

SUMMARY OF THE INVENTION

One of the principal objects of the invention is to provide a more effective means for controlling the dispersion and changing the direction of light to enhance the growth of plants, especially in shady areas.

Another object is to provide more cost-effective solar heating for nearby objects, such as water in a swimming pool.

Another object is to provide more interesting exotic lighting arrangements for darkened areas.

Another object is to provide controlled-glare reflective surfaces for use as signs and markers.

Prior art does not control reflective surfaces of scabrous texture to improve performance for the purposes cited.

Other objects and advantages of the invention will become apparent from the following description, and it will be apparent that many changes may be made in the details of composition, construction, and arrangement of parts shown and described without departing from the spirit of the invention as expressed in the accompanying claims. We, therefore, do not wish to be limited to the exact details of construction and arrangement of parts shown and described, as the preferred forms only have been given by way of illustration.

DESCRIPTION OF THE PREFERRED EMBODIMENT

Figure 1:
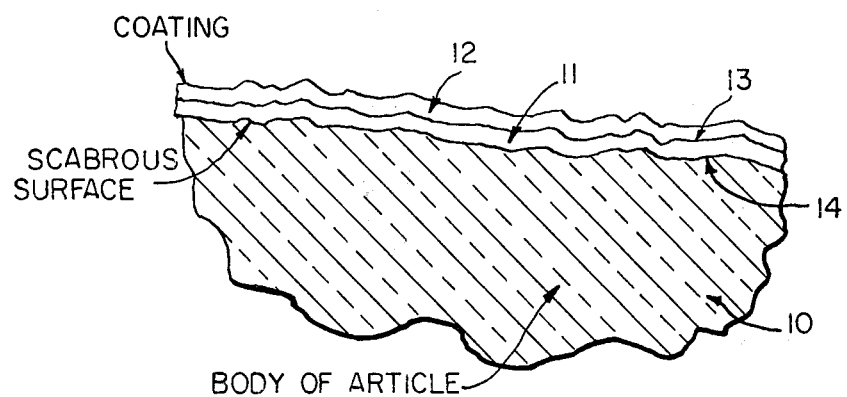
FIG. 1 illustrates the diagrammatic form of a highly magnified fragmentary sectional view of an article having a laminated reflective coating on a surface thereof according to the invention.
Figure 2:
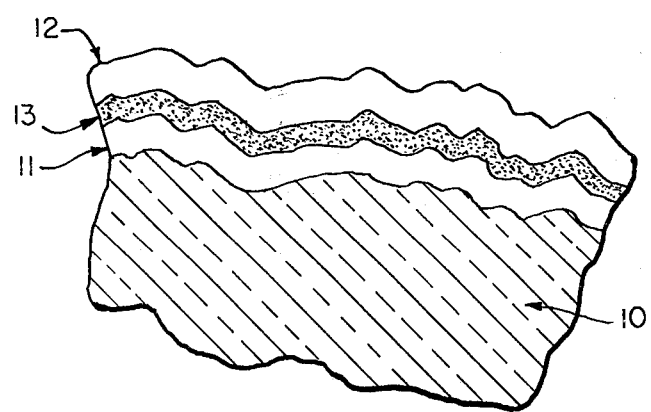
FIG. 2 illustrates a more highly magnified fragmentary cross-sectional view thereof.

In following the teachings of the invention, the substrate 10 to be coated may be composed of many different materials, such as: (1) an etched glass plate, (2) a fiberglass panel, (3) a mylar sheet, (4) a metallic foil, and (5) a plastic strip.

For example, a fiberglass panel is used as the substrate which imparts its surface texture to its laminated coating for the dispersion and redirection of sunlight to enhance the growth of plants. The laminated reflective coating is closely affixed to the surface of the fiberglass; so that, its surface texture is imparted to the surface of the coating. Both the texture of the fiberglass substrate and the color of the coating are selected to produce the dispersion and reflective characteristics required for enhanced plant growth. The laminated reflective coating consists of two layers 11, 12 of transparent film with a microscopic layer of aluminum 13 sandwiched between them.

The scabrous surface 14 of the fiberglass panel is caused by randomly located glass fibers embedded in the fiberglass resin.

Having described our invention, we claim:

1. A scabrous surface light director comprising:
   a substrate possessing a scabrous surface; and
   a reflective coating adhered to the surface of said substrate, said reflective coating comprising a laminated reflective film whose surface conforms to the texture of the substrate and comprises a thin layer of aluminum sandwiched between transparent films.

2. A scabrous surface light director as defined in claim 1, wherein:
   said substrate having a reflective coating adhered to its surface, said coating comprising a laminated reflective film of aluminum sandwiched between transparent films, the surface texture and color of said light director determining the dispersion, quantity, and spectral content of the light reflected by said light director.

3. A scabrous surface light director as defined in claim 1, wherein:
   the size of said light director determines the dispersion and quantity of the light reflected.

4. A light director comprising:
   a scabrous substrate having a reflective coating adhered to said substrate, the surface of said coating being also scabrous, said coating comprising a thin layer of aluminum sandwiched between transparent films, the texture of said substrate and the color of said coating being selected to produce the dispersion and reflective characteristics required to enhance plant growth.

5. A light director as defined in claim 4, wherein:
   said substrate being etched plate glass.

6. A light director as defined in claim 4, wherein:
   said substrate comprising a fiberglass panel.

7. A light director as defined in claim 4, wherein:
   said substrate comprising a mylar sheet.

8. A light director as defined in claim 4, wherein:
   said substrate being a metallic foil.

9. A light director as defined in claim 4, and:
   said substrate being a plastic strip.

10. A light director as defined in claim 6, wherein:
    said scabrous surface of said fiberglass panel being caused by randomly located glass fibers embedded in the fiberglass resin of the fiberglass panel.

11. A light director comprising:
    a substrate having an irregular surface;
    a layer of film adhered to said surface;
    a layer of aluminum film adhered to said film; and
    a layer of film adhered to said aluminum, said layers having irregular surfaces and having color compositions effective for the dispersion and redirection of sunlight to enhance the growth of plants in shady areas.

* * * * *